JAMES RUE. Improvement in Cultivators.
No. 126,156. Patented April 30, 1872.

Witnesses: Inventor:

UNITED STATES PATENT OFFICE.

JAMES RUE, OF ENGLISHTOWN, NEW JERSEY.

IMPROVEMENT IN CULTIVATORS.

Specification forming part of Letters Patent No. 126,156, dated April 30, 1872.

Specification describing certain Improvements in Cultivators, invented by JAMES RUE, of Englishtown, Monmouth county, New Jersey.

The improved cultivator belongs to that class which is adapted to straddle the rows of potatoes or other plants, and to dig up the earth in several furrows on each side, turning it over toward the plants so as to aid in hilling round them, if that be desired. A good example of such cultivator is described in the patent issued to me dated 9th August, 1859.

The present invention relates to important modifications of the details.

The following is a description of what I consider the best means of carrying out the invention.

The accompanying drawing forms a part of this specification.

Figure 1:
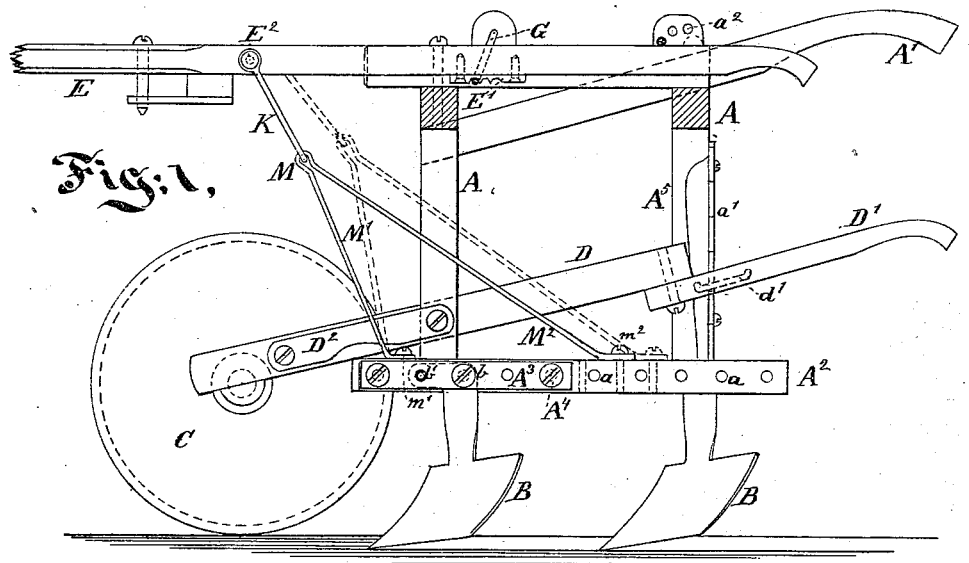
Figure 2:
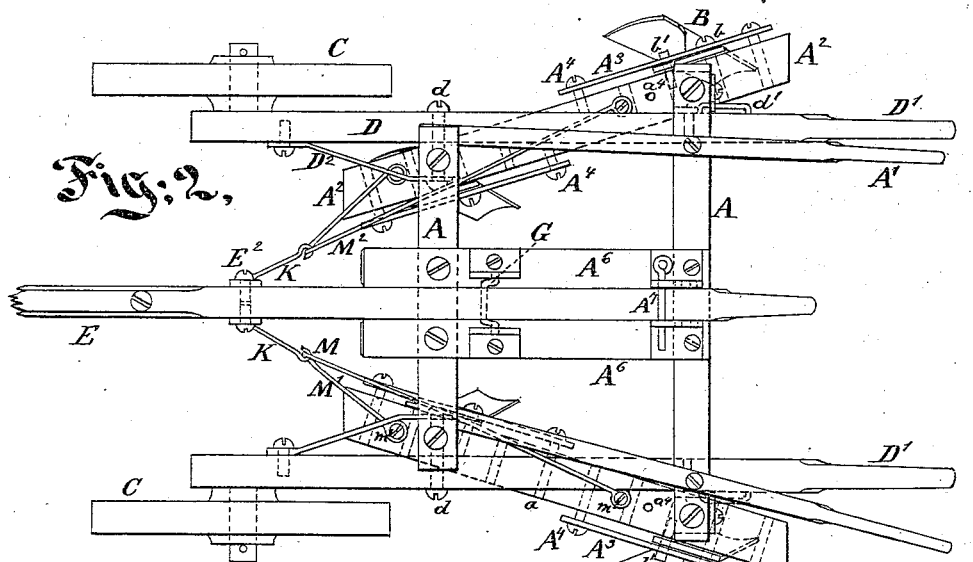
Figure 3:
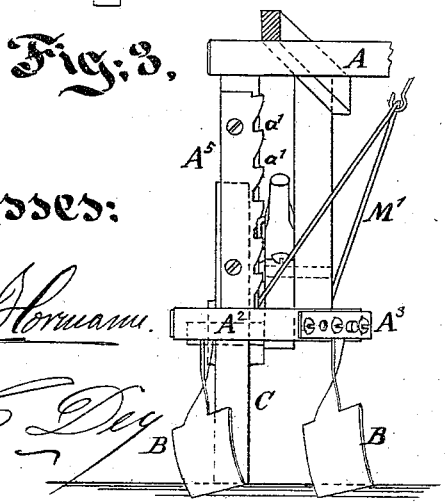

Figure 1 is a longitudinal section. Fig. 2 is a plan view; and Fig. 3 is a rear elevation of a portion.

Similar letters of reference indicate corresponding parts in all the figures.

A is a fixed frame-work, which bridges across at a sufficient height to pass freely over corn or other plants of many weeks' growth. Certain portions of this framing may be designated by $A^1$ $A^2$, &c., when it is necessary to distinguish them. The upper portion is provided with handles $A^1$, rigidly attached, as represented, and which may be conveniently grasped by an attendant, who walks behind. B B, &c., are cultivator-teeth, made by preference from rolled steel. They are shaped by dies or otherwise in the forms represented, and are peculiarly mounted on the oblique parts $A^2$ at the base of the framing A. They are mounted on changeable bolts $b$, which serve as pivots, and are stiffly set in their desired positions by means of weak pins $b'$, made of soft wood or other cheap material, which may be sheared off by the strain whenever the corresponding tooth strikes a stump, root, or fixed rock which it cannot otherwise pass. It will be understood that the pivot $b$ is strong and always reliable, and that the tooth, when liberated by the breaking of the pin $b'$, simply inclines and passes over the projection, and thenceforward drags idly until it can be again set by the insertion of another pin, $b'$. The pin $b'$ must be of sufficient strength to endure all the ordinary strains and to only break when the tooth strikes some extraordinary obstacle. The upper portion of each tooth B, which is provided with the holes for the reception of the pins $b$ $b'$, is made perfectly plain, and is inclosed in a corresponding flat space between the exterior face of an oblique piece, $A^2$, and a flat outside piece of iron, $A^3$. The latter is secured by bolts $A^4$, which are changeable in the holes $a$, of which there is a series extending the whole length of each piece $A^2$. Before the bolts $A^4$ are inserted, the plates $A^3$ may be shifted forward or backward by inserting the bolts $A^4$ in holes $a$ further forward or further backward than before. This change will induce a corresponding change of position of the tooth when it is introduced. Furthermore, the tooth may be shifted forward or backward to a less extent in the corresponding, but smaller series of holes in the plate $A^3$, which match in position with the holes $a$ in the piece $A^2$. Furthermore, the plate $A^3$ and its several attachments may be shifted from the outer face to the inner face of the oblique framing $A^2$, and the corresponding changes of the forward and backward plate $A^3$, and of the teeth within these plates, may be made in the inside of the framing. It follows that the positions of the several teeth B may all be adjusted outward or inward by very small increments, and with very simple mechanism: first, by changing the teeth themselves forward and backward by simply changing the positions of the pins $b$ $b'$; second, by changing the entire plate $A^3$ and its holding-bolts $A^4$ forward and backward on the oblique framing $A^2$; and third, by changing the entire plate $A^3$ and its holding-bolts $A^4$ with the pins $b$ $b'$, and the tooth to the inside instead of allowing it to remain on the outside of the oblique framing. A further change of position of these teeth which obviously follows from their structure and the coincidence in the position of their holes, consists in the exchanging of all their teeth here represented as being on the right-hand side of the machine to the left, and those on the left to the right. Thus conditioned, the machine may be drawn between instead of astride of the rows. C C are bearing-wheels, each mounted on the front end of a lever, D, which turns on a pivot, $d$, and is capable of being tilted by hinged handles $D^1$ near the rear end. These handles are provided with side pieces $d'$ adapted to engage in notches $a^1$ formed in plates bolted on the sides of the upright parts $A^5$. By adjusting these levers in different positions by engaging the levers in different notches $a^1$, the wheels C may be raised and lowered, and the corresponding depth to which the teeth B will tend to act may be thereby graduated with great facility. The action of this adjustment will be very readily understood. When in an extreme case it is desired to lift the teeth entirely out of the earth and cause the machine to skim along on the surface, it is simply necessary to lift the handles $D^1$ to their highest possible elevation, thereby depressing the wheels C so that their lowest points stand below the planes of the bottoms of the teeth. The horses or other draft animals are attached to a tongue, E, in the ordinary or any suitable manner. The attachment of this tongue to the framing is peculiar. It lies between two parallel parts, $A^6$, on the top of the framing, and is capable of moving in the limited space thus provided. The rear end is held down by a pin, $A^7$, which is changeable in holes $a^2$ formed in plates, attached as represented. Forward of these the tongue rests on a swinging stirrup, G, swinging on slightly elevated centers attached to the parallel frame $A^6$. It rests on this stirrup by means of a notched piece, $E^1$, bolted on the under face of the tongue, and which is provided with a series of notches, so that the position of the tongue may be shifted forward and backward within slight limits by simply changing the bearing stirrup G from one notch to another forward or backward. Forward of this again the tongue E is connected by means of a stout transverse bolt, $E^2$, and links K K to eyes M formed in the bight of double irons $M^1$ $M^2$, which are bolted to the oblique frame pieces $A^2$. The links K are free to swing, but the eyes M are fixed relatively to the framing A for any given depth of work. The movements of the animals, or the tilting of the entire cultivator by the operator acting on the handles $A^1$, may move the tongue E and the framing A relatively to each other to a considerable extent, and the swinging stirrup G will accommodate such motion, but the extent of such motion is limited, and the inclination of the links K change at every movement. The ultimate effect of draft is controlled under these conditions by the position of the eyes M. These latter are changeable up and down by changing the positions of the points of attachment of the arms or rods $M^2$. Each of the double rods $M^1 M^2$ is attached to the oblique frame pieces $A^2$ by bolts. The forward part or arm $M^1$ of each is connected by a bolt, $m^1$, which has a rounded head, and allows of some movement. The entire iron is capable of springing somewhat by shifting the rear bolt $m^2$ forward or backward in the several holes $a^4$ represented. The position of the corresponding eye M is changed up and down at will. Fig. 1 shows the adjustment in this respect in dotted lines. Each lever D is braced by a plate of iron, $D^2$, which extends from the inner face of the post A, and is fixed near the forward end of the lever, as shown in Figs. 1 and 2. It will be understood that the wheels C may be made very light by making them open frames with spokes and rim instead of continuous plates, as here shown. They may be made of wood or they may be light frames of iron with wire or analogous wrought-iron spokes. The teeth may be made of cast-iron. The entire machine may be made of iron, if preferred.

I claim as my invention—

1. The plates $A^3$ and their holding means $A^4$, changeable in position, as shown, in combination with the inclined frame pieces $A^2$ and teeth B, and suitable securing means $b$ $b'$, and arranged to serve therewith, as and for the purposes herein specified.

2. The eyes M and arms or parts $M^1 M^2$, connected by the movable or adjustable fastenings $m^2$, as shown, in combination with the links K and pole or tongue E, when the latter has liberty to move forward and backward to a limited extent, all arranged and operating substantially as and for the purposes herein specified.

3. The arrangement of the wheels C, and levers D $D^1$, and notches or holding points $a^1$ serving, relatively, to the teeth B, frame A, tongue E, stirrup-link G, and adjustable eye M, as and for the purposes herein set forth.

In testimony whereof I have hereunto set my hand this 22d day of February, 1872, in the presence of two subscribing witnesses.

JAMES RUE.

Witnesses:
 Jos. R. Martin,
 Wm. C. Dey.